US005991765A

United States Patent [19]
Vethe

[11] Patent Number: 5,991,765
[45] Date of Patent: Nov. 23, 1999

[54] SYSTEM AND METHOD FOR STORING AND MANIPULATING DATA IN AN INFORMATION HANDLING SYSTEM

[75] Inventor: Olaf Vethe, Oslo, Norway

[73] Assignee: Birdstep Technology AS, Oslo, Norway

[21] Appl. No.: 08/852,099

[22] Filed: May 6, 1997

[51] Int. Cl.[6] .................................................. G06F 17/30
[52] U.S. Cl. .............................. 707/103; 707/2; 707/101; 707/102
[58] Field of Search ................................. 707/2, 101, 103, 707/102; 395/183.14, 183.16, 500, 670, 672, 685, 701, 705, 500.48; 345/326, 335, 340, 352; 706/10; 709/100, 305; 710/60; 714/38, 40

[56] References Cited

U.S. PATENT DOCUMENTS

| 4,657,057 | 4/1987 | Ha ........................................... 152/415 |
| 4,989,132 | 1/1991 | Mellender et al. ....................... 364/200 |
| 5,040,995 | 8/1991 | Graninger et al. ......................... 439/76 |
| 5,090,865 | 2/1992 | Ramachandran et al. ............... 415/112 |
| 5,226,161 | 7/1993 | Khoyi et al. .............................. 395/650 |

(List continued on next page.)

FOREIGN PATENT DOCUMENTS

| 7-200381 | 8/1995 | Japan . |
| 8-036518 | 2/1996 | Japan . |
| 8-272815 | 10/1996 | Japan . |
| 8-328938 | 12/1996 | Japan . |

OTHER PUBLICATIONS

"Databases for a New Generation," *Object Expert*, vol. 1, No. 3, Mar.–Apr. 1996, pp. 26–28 and 30–31.

"An Object Model of Data, Based on the ODMG Industry Standard for Database Applications," *IEE International Seminar of Client/Server Computing Seminar Proceedings*, Oct. 1995, vol. 1, pp. 13/1–8.

"Intersection of Relational and Object," *Proceedings AM/FM International Annual Conference XVII*, Mar. 1994, pp. 69–75.

"Object Identity in Database Systems," *Journal of Computer Science and Technology*, Jul. 1995, vol. 10, No. 4, pp. 380–384.

"Object–Oriented Database Systems and Their Application Software Development Enviroments," *Fernmelde–Ingenieur*, vol. 49, No. 6–7, pp. 1–68, Jun.–Jul. 1995.

"Distributed Client–Server Databases," *Object Magazine*, vol. 4, No. 1, pp. 47, 50–52, Mar.–Apr. 1994.

(List continued on next page.)

*Primary Examiner*—Paul R. Lintz
*Assistant Examiner*—Diane D. Mizrahi
*Attorney, Agent, or Firm*—Jenkens & Gilchrist

[57] ABSTRACT

The present invention is directed to a database and database management system and method designed to store and manipulate any type of data and any combination of data types. The underlying data architecture is uniquely flexible, and thus to the DBMS, the data in the database will appear to be of a type consistent with the access method of the DBMS. Further, the present invention allows a number of simultaneous, different access methods to the same underlying data, delivering the ability to work with complex data within one easily managed system. One of the key aspects of the present invention is the "atomization" of the data. Atomization is the separation of the storage of data content from its definition, as well as from its occurrences or instances in the database. An atom is the most basic element in the database. Data content is stored in content atoms, data definitions are stored in type atoms, and each instance of the same data value/property is represented by instance atoms. When connected, the three different atom types form a molecule. Complex data may be represented in the database by linking together instance atoms from several molecules to form inner relations, and then by further linking together inner relations to form outer relations.

29 Claims, 9 Drawing Sheets

U.S. PATENT DOCUMENTS

| | | | |
|---|---|---|---|
| 5,295,261 | 3/1994 | Simonetti | 395/600 |
| 5,297,279 | 3/1994 | Bannon et al. | 395/600 |
| 5,381,547 | 1/1995 | Flug | 395/700 |
| 5,426,747 | 6/1995 | Weinreb et al. | 395/400 |
| 5,437,027 | 7/1995 | Bannon et al. | 395/600 |
| 5,469,562 | 11/1995 | Saether | 395/182.18 |
| 5,515,502 | 5/1996 | Wood | 395/182.13 |
| 5,522,071 | 5/1996 | Guillen et al. | 395/650 |
| 5,535,383 | 7/1996 | Gower | 395/600 |
| 5,551,024 | 8/1996 | Waters | 395/600 |
| 5,557,795 | 9/1996 | Venable | 395/670 |
| 5,560,006 | 9/1996 | Layden et al. | 395/600 |
| 5,561,759 | 10/1996 | Chen | 395/182.02 |
| 5,572,673 | 11/1996 | Shurts | 395/186 |
| 5,583,983 | 12/1996 | Schmitter | 395/705 |
| 5,586,326 | 12/1996 | Ryu et al. | 395/701 |
| 5,590,334 | 12/1996 | Saulpaugh et al. | 395/683 |
| 5,600,838 | 2/1997 | Guillen et al. | 395/683 |
| 5,613,058 | 3/1997 | Koppolu | 345/326 |
| 5,752,028 | 5/1998 | Ellacott | 707/103 |
| 5,801,701 | 9/1998 | Koppolu | 345/352 |
| 5,864,862 | 1/1999 | Kriens | 707/103 |
| 5,864,864 | 1/1999 | Lerner | 707/102 |

OTHER PUBLICATIONS

"Formal Specification of a Persistent Object Management System," *Information and Software Technology*, vol. 35, No. 5, pp. 277–286, May 1993.

"A Database with an Explicit Semantic Representation," *Industrial an Engineering Applications of Artificial Intelligence and Expert Systems. Proceedings of the Seventh International Conference*, pp. 323–332, 1994.

"SIM: A Database System Based on the Semantic Data Model," *SIGMOD Record*, vol. 17, No. 3, pp. 46–55, Sep. 1988.

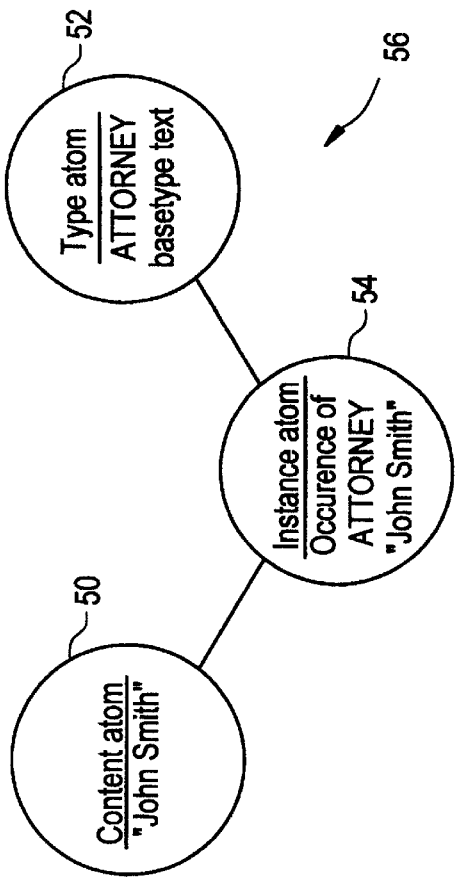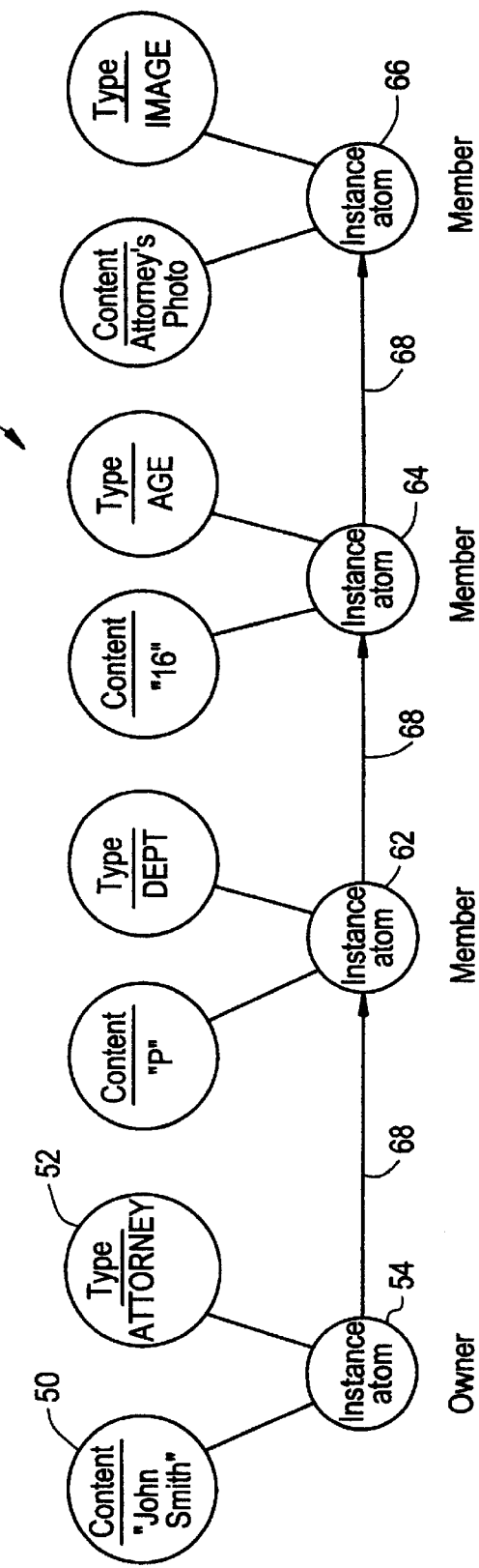

SYSTEM AND METHOD FOR STORING AND MANIPULATING DATA IN AN INFORMATION HANDLING SYSTEM

FIELD OF THE INVENTION

The present invention relates to information handling systems, and, more particularly, to a system and method for storing and manipulating data in an information handling system.

BACKGROUND OF THE INVENTION

A database consists of one or more large sets of persistent data. Typically, users can update and query the database using software associated with the database.

A database is the data stored by a database management system (DBMS). A DBMS is a set of software programs that control the organization, storage, and retrieval of data in a database. A DBMS also controls the security and integrity of the database. Typically, a DBMS also provides an interactive query facility, which allows a user to interactively search and analyze data from the database.

There are several prior art methods available for organizing data in a database. The three most common types of prior art databases are hierarchical, network, and relational. A DBMS may provide one or more of these, and other, types of database organization.

In a hierarchical database, the data items are referred to as records, and are stored in a tree structure. Hierarchical databases link records together in a manner similar to a typical organization chart. This means that each record can be owned by only one owner record. For example, a department record may "own" fifteen employee records. However, each employee record may only be owned by one owner record, in this case by its department record. This makes it difficult to model real world situations using a hierarchical database. For example, an employee may be both a member of a department and a member of a team made up of employees from several departments. However, a hierarchical database would not allow the same employee record to be owned by both a department record and a team record.

A network database is similar to a hierarchical database, however, data records may be freely interconnected, with no requirement that the data records fit in a tree structure. In a network database, an employee record could be owned by both a department record and a team record.

Both hierarchical databases and network databases are time-consuming to search and difficult to change. Changing the data structures in a hierarchical or a network database typically requires shutting down the database and rebuilding it.

Another type of prior art database is a relational database. In a relational database, all data is stored in simple tables, referred to as relations. Relational databases remove the complex relationships between records found in hierarchical and network databases. The design of the records in a relational database provides a common field, such as employee number, for matching. Often, the fields used for matching are indexed in order to speed up searching.

However, there are several disadvantages to relational databases. Relational databases are complex and unnatural for many data structures (i.e. network type data structures). Relational databases are redundant, as many fields are stored in more than one relation. While the use of index fields can increase query speed, the space needed to store the indexes can sometimes become significantly larger than the space needed to store the data in the database. The use of indexes is also redundant. This redundancy, along with the redundant storage of data fields in more than one relation, can cause performance degradation when there are a high volume of updates to the database. Finally, the administration cost of a relational database is high, as data must be frequently reorganized to keep performance acceptable.

Because of the many disadvantages of prior art databases, such as hierarchical, network, and relational models, some software manufacturers have begun developing object-oriented databases (OODBs). However, the OODBs that exist today use traditional storage technology (i.e. relational and other) to actually store the data. Current OODBs and object database management systems (ODMSs) are really object-oriented interfaces to old database technologies and old database management systems. Current OODBs and ODMSs actually try, although not very successfully, to use today's currently existing technology (i.e. relational and other) to store object-oriented data.

Consequently, it would be desirable to have a database, and database management system and method, for organizing data so that it can be accessed as if it were any conceivable database organization, including those discussed above. It would be desirable if the system and method could support many simultaneous, different access methods and storage/retrieval syntaxes. Further, it would be desirable if the system and method allowed fast and efficient searching, dynamic schema evolution with no need to take the database off-line for restructuring, and automatic history generation.

SUMMARY OF THE INVENTION

Accordingly, the present invention is directed to a database and database management system and method designed to store and manipulate any type of data (i.e. text, numeric, spatial, graphical, etc.) and any combination of data types. The underlying data architecture is uniquely flexible, and thus to the DBMS, the data in the database will appear to be of a type consistent with the access method of the DBMS (although, of course, the underlying structure of the database does not change). Further, the present invention allows a number of simultaneous, different access methods to the same underlying data, delivering the ability to work with complex data within one easily managed system.

One of the key aspects of the present invention is the "atomization" of the data. Atomization is the separation of the storage of data content from its definition, as well as from its occurrences or instances in the database. An atom is the most basic element in the database. Data content is stored in content atoms, data definitions are stored in type atoms, and each instance of the same data value/property is represented by instance atoms. When connected, the three different atom types form a molecule. Complex data may be represented in the database by linking together instance atoms from several molecules to form inner relations, and then by further linking together inner relations to form outer relations.

One advantage of the present invention is that it is able to automatically maintain a separate chronological history for every instance atom in the database. When modifying the content atom (i.e. the data value) of a molecule, the database will (at the user's option) either reconnect the instance atom to a new content atom, or generate a new instance with the new content and link the old instance into a history chain.

Another advantage of the present invention is a unique search structure which allows for fast and efficient searching of the database. For each content atom, the DBMS uses the 'n' most significant bytes in the data as a vector into the system's search structure. The DBMS splits the search structure into 'm' separate mini-structures where 'm' is the range of the 'n' most significant bytes. The actual content atom is then stored in its vector's mini-structure.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which:

FIG. 2 depicts a content atom, type atom, and instance atom linked together to form a molecule;

FIG. 3 depicts several molecules linked together to form an inner relation;

DETAILED DESCRIPTION OF A PREFERRED EMBODIMENT OF THE INVENTION

Figure 1:
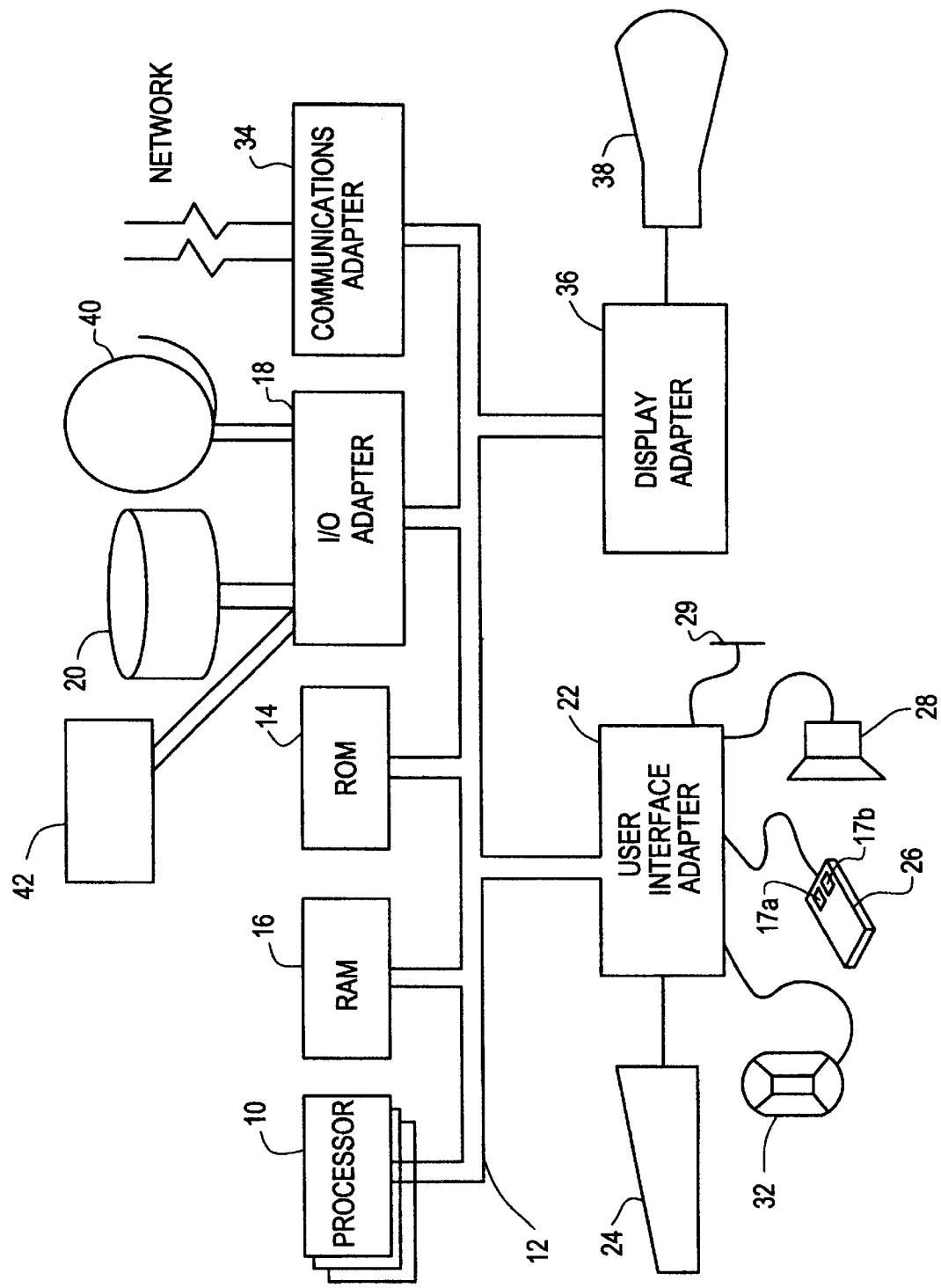
FIG. 1 is a block diagram of an information handling system capable of storing and manipulating the atomic database of the present invention.

The invention may be implemented on a variety of hardware platforms, including personal computers, workstations, minicomputers, and mainframe computers. Many of the steps of the method of the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38. Communication adaptor 34 may link the system depicted in FIG. 1 with hundreds or even thousands of similar systems, or other devices, such as remote printers, remote servers, or remote storage units.

The system and method of the present invention are designed to store and manipulate any type of data (i.e. text, numeric, spatial, graphical, etc.) and any combination of data types. The underlying data architecture is uniquely flexible. As a result, the database management system (DBMS) of the present invention can be a relational DBMS, an object DBMS, a hierarchical DBMS, or any other DBMS. In addition, each structure's storage/retrieval syntax (e.g. SQL for relational, OQL for object, etc.) may be used to access and retrieve data from the database. To the DBMS, the data in the database will appear to be of a type consistent with the access method of the DBMS (although, of course, the underlying structure of the database does not change). Further, the present invention allows a number of simultaneous, different access methods to the same underlying data, delivering the ability to work with complex data within one easily managed system.

One of the key aspects of the present invention is the "atomization" of the data. Atomization is the separation of the storage of data content (e.g. the string "John Smith") from its definition (i.e. its data type and relationship to other data elements), as well as from its occurrences or instances in the database.

An "atom," also referred to as an "element," is the most basic element in the database. Referring now to FIG. 2, the relationship among the three elements, or atom types, is depicted. Data content, in this case "John Smith," is stored in content atom 50, its definition is stored in type atom 52, and each instance of the same data value/property is represented by instance atom 54. When connected, the three different atom types 50, 52, 54 form molecule 56. Type atoms 52 and instance atoms 54 consist of a data structure of values and pointers. The DBMS manages these atoms and the many possible relationships between them.

Type atom 52 contains the definition of instance atom 54 (referred to as a field definition in prior art terminology). This definition is a data structure with a number of elements including both a typename and a basetype. The typename could be "Name," "Birthdate," "Patient," "Supplier," etc. The basetype determines how the data is physically represented in the database (i.e. name=text, birthdate=long integer, etc.).

Content atom 50 holds data values (i.e, "John Smith," "10091962," etc.). Each data value is stored only once in the database. Multiple instances of the same data value are differentiated by their instance atoms 54 (as described below with reference to FIGS. 6 and 8). Even if a data value is common to several type atoms 52 it is still physically stored just once. For example, "John Smith" could be an instance of type atoms "Attorney," "Parent," and "Supplier," but only one content atom with "John Smith" as its data value is created. Content atom 50 holds both the data value and a pointer to the structure of its instance atoms 54 (as described below with reference to FIGS. 6 and 8).

Instance atom 54 acts as the connector between type atom 52 and content atom 50. Each instance atom 54 defines one occurrence of a combination (i.e., Type atom "Attorney"+ Content atom "John Smith"), which represents an instance of a field or object in the database.

Molecule 56 is depicted in FIG. 2, and consists of one atom of each type 50, 52 bound through an instance atom 54. An incomplete molecule (not shown) consists of an instance atom 54 connected to either a type atom 52 or a content atom 50, but not to both. An incomplete molecule may be used to store data with no predefined type. This allows the flexibility to store data, and decide on its type later. An incomplete molecule may also be used to define instances with no data or with undefined data. This adds a flexibility to database design that is not available in the prior art, but is often needed. For example, suppose the DBMS receives unstructured data from optical scanning of newspaper advertisements. It is impossible for the DBMS to know the type of the various text items in an advertisement, because the placement of different items (phone, fax, address, name, description etc.) will be different for each advertisement. Therefore, all items initially do not have a type, but because their content is known a user may search for the items. At a later point in time, specific types may be allocated to the items.

Referring now to FIG. 3, an inner relation 60 is depicted. In this example, inner relation 60 consists of instance atoms 54, 62, 64, and 66, which are linked together with pointers 68. Inner relation 60 can be used as the equivalent to the data fields in a conventional record, or can be a more complex data type, such as a spatial data type, with one atom for each of "n" coordinates.

As shown in FIG. 3, an owner is the first instance atom, in this case instance atom 54, in inner relation 60. The members are the instance atoms, including the owner, which belong to the inner relation. In the example shown in FIG. 3, instance atoms 62, 64, and 66, along with owner atom 54, are the members of inner relation 60.

Inner relations may be linked together to form outer relations. One of the available basetypes is "pointer," which means that a content atom in a molecule can act as a pointer to a specific place in the database, usually an instance atom (e.g., an instance atom in another inner relation). This capability allows linking between distinct inner relations to form infinitely complex data structures.

Figure 4:
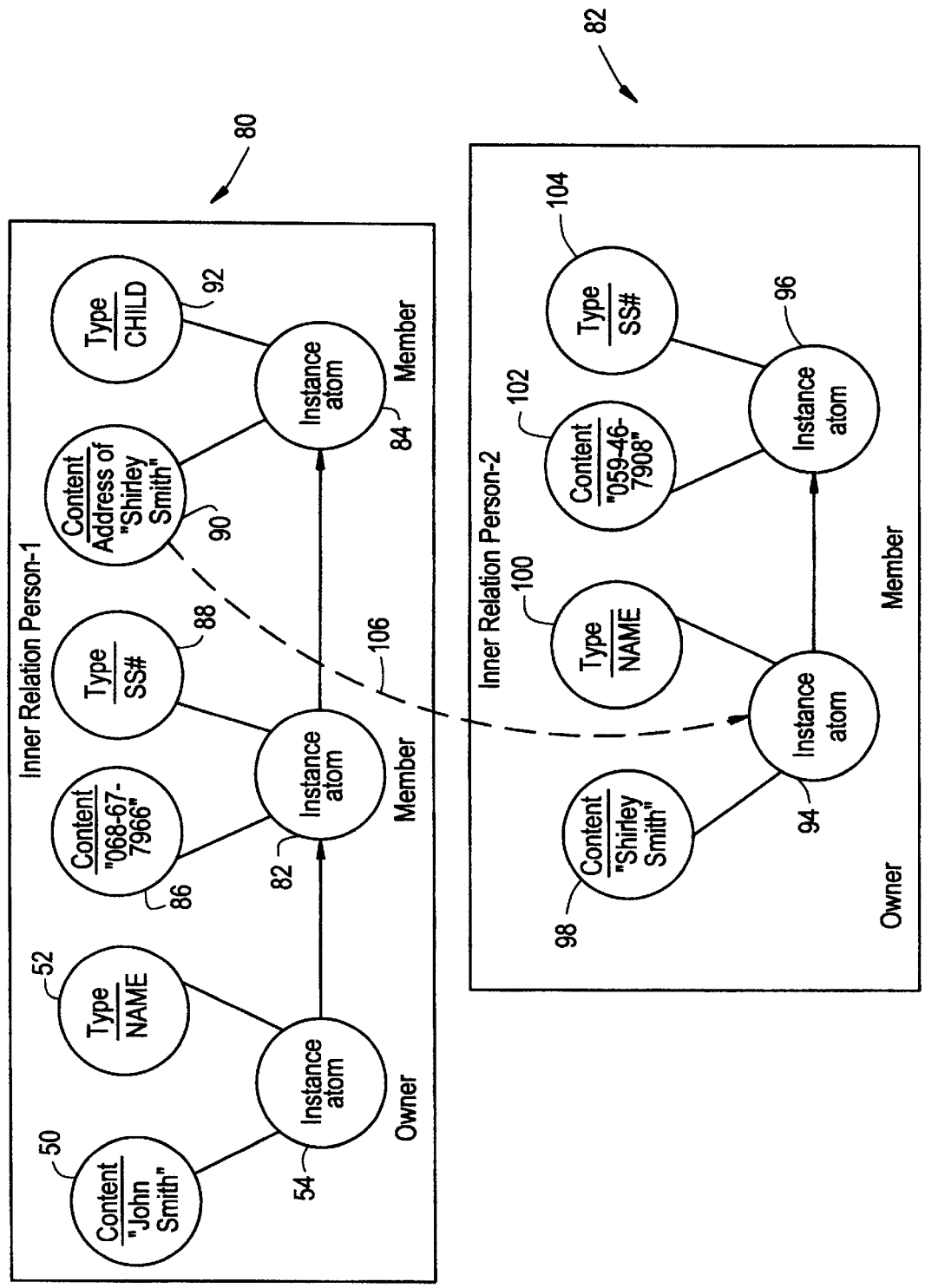
FIG. 4 depicts two inner relations linked together to form an outer relation.

Referring now to FIG. 4, an example of an outer relation is illustrated. In FIG. 4, there are two inner relations shown, inner relation Person-1 80 and inner relation Person-2 82. Person-1 80 consists of three instance atoms 54, 82, and 84. Instance atom 54 is linked to content atom 50 and type atom 52. Instance atom 82 is linked to content atom 86 and type atom 88. Instance atom 84 is linked to content atom 90 and type atom 92. Person-2 82 consists of two instance atoms 94 and 96. Instance atom 94 is linked to content atom 98 and type atom 100. Instance atom 96 is linked to content atom 102 and type atom 104.

In the example depicted in FIG. 4, Person-1 80 is the parent of Person-2 82 (note that type atom 92 is of type "CHILD"). Content atom 90 contains the address of instance atom 94 (as denoted by dashed line 106). Person-1 80 could be linked to several children through the use of additional address links, similar to the address link of content atom 90. The combination of two or more inner relations forms an outer relation, which in this case could represent an entire family.

The system and method of the present invention is able to automatically maintain a separate chronological history for every instance atom in the database. When modifying the content atom (i.e. the data value) of a molecule, the database will (at the user's option) either reconnect the instance atom to a new content atom, or generate a new instance with the new content and link the old instance into a history chain. As a result, the database can automatically maintain a separate chronological history on every instance in the database.

Figure 5:
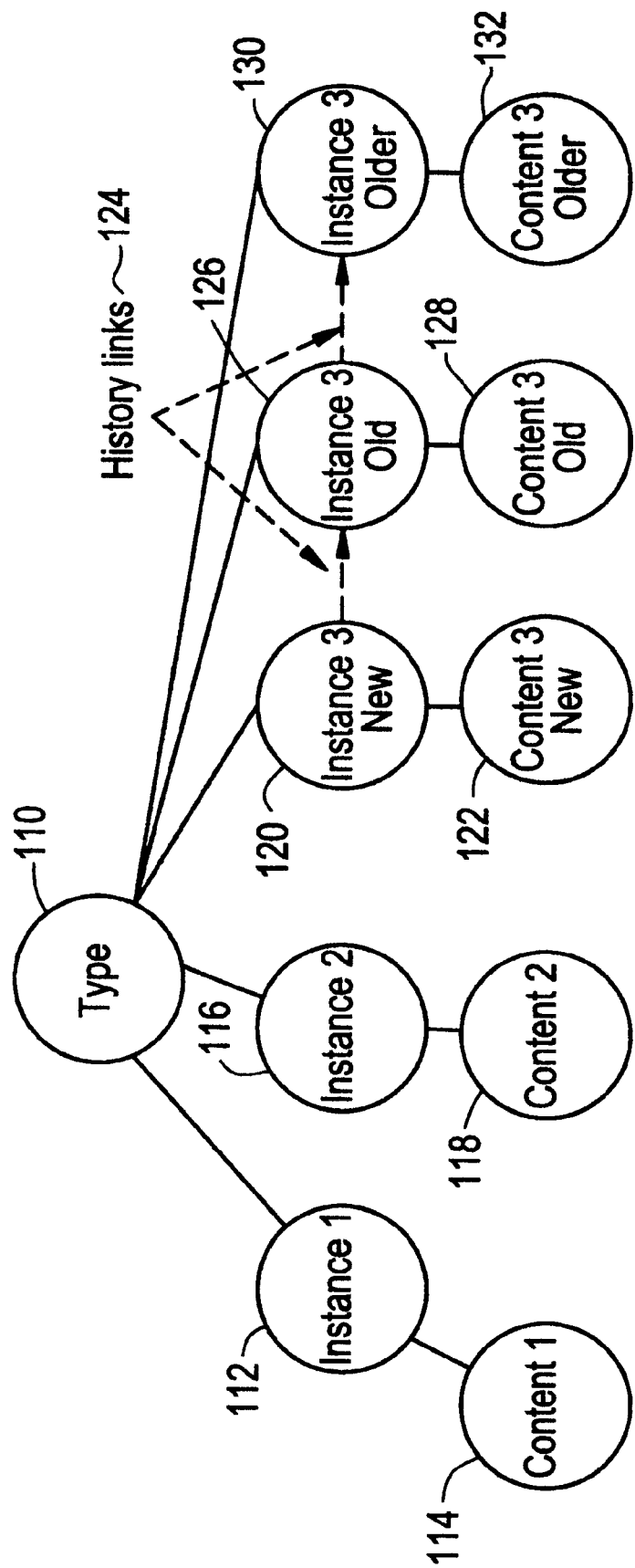
FIG. 5 illustrates the manner in which history links may be used to maintain instance history.

An example of instance history formation is depicted in FIG. 5. Type atom 110 is linked to three instance atoms, Instance1 112 (which is linked to Content1 114), Instance2 116 (which is linked to Content2 118), and Instance3 120 (which is linked to Content3 122). Note that history links 124 connect Instance3 120 with two older versions 126, 130 of Instance3 (along with their content atoms 128, 132).

Figure 6:
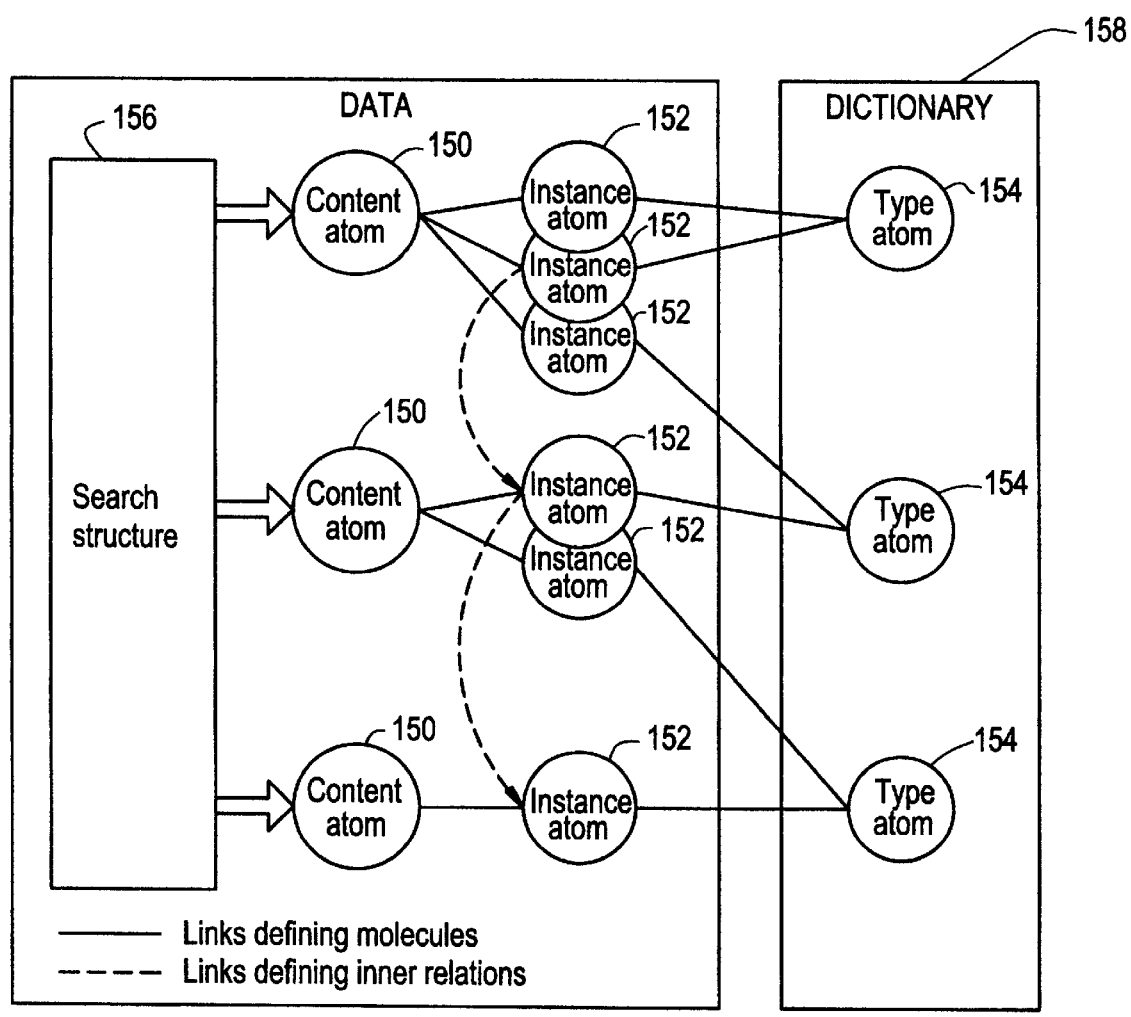
FIG. 6 depicts the internal components of the database of the present invention.

The main internal components of the database of the present invention are shown in FIG. 6. The components depicted in FIG. 6 are stored in RAM 16 of FIG. 1. The solid lines in FIG. 6 show the links defining molecules, while the dashed lines show the links defining inner relations. As discussed above, withe reference to FIG. 2, each molecule consists of a content atom 150, an instance atom 152, and a type atom 154. Inner relations are formed by defining links between instance atoms 152. Search structure 156 is defined in more detail below, with reference to FIG. 9. Type atoms 154 are stored in dictionary 158, which is itself, a database according to the present invention, thus providing user-extensibility for type definitions.

Figure 7:
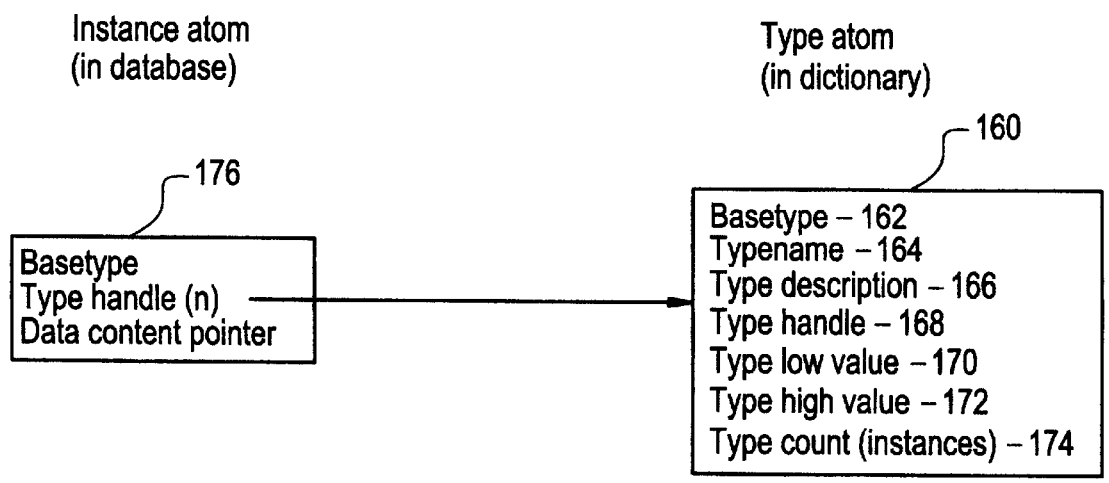
FIG. 7 depicts further details regarding the internal structure of the database of the present invention.

Further details regarding the internal structure of the DBMS are illustrated in FIG. 7. When each type atom 160 is created, it contains a set of characteristics. In the described embodiment, these characteristics include basetype 162, typename 164, type description 166, type handle 168, type low value 170, type high value 172, and type count (instance) 174. Each type atom 160 is allocated a unique type handle 168, which is a number that uniquely identifies the type atom 160. Type handle 168 is part of the information contained in each instance atom 176, thus uniquely identifying each instance atom 176 with its type atom 160.

Figure 8:
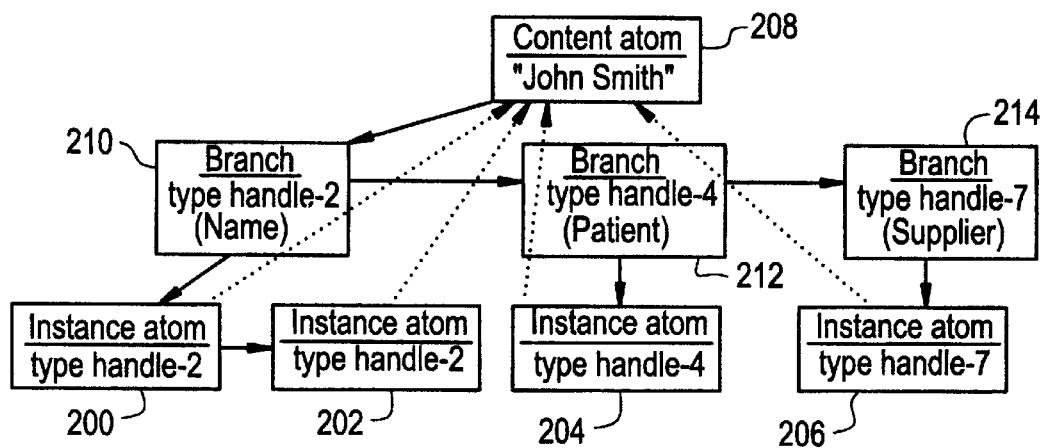
FIG. 8 depicts an internal structure of the database used to improve searching performance.

Content atoms are maintained as an integral part of the database. Each content atom is part of a separate search structure that starts from the content's vector (described below with reference to FIG. 9). Each instance atom is stored under its content atom in a two-level hierarchy, as depicted in FIG. 8. Referring now to FIG. 8, the instance atoms 200, 202, 204, 206 are shown at the lowest level of the hierarchy, grouped by type handle. At the first level below content atom 208, there are a set of "branches" 210, 212, 214 each of which contains a type handle. There is one branch for each of the type handles for which there is one or more corresponding instance atoms (and no branch if there are no instances of a particular type handle). These branches are linked in ascending order. This structure is used internally by the DBMS (i.e. it is not available to the user) for searches and for improving performance.

When inserting or updating data elements, the user (typically, an application programmer) locates the correct position in an inner relation by traversing the linking between instances. Next, the deposition is found under the content/branch hierarchy, and then the new instance (or modified instance) is stored and linked into both the instance chain and the content structure.

The system and method of the present invention includes a unique search structure which allows for fast and efficient searching of the database. For each content atom, the DBMS uses the 'n' most significant bytes in the data as a vector into the system's search structure. The DBMS splits the search structure into 'm' separate mini-structures where 'm' is the range of the 'n' most significant bytes. The actual content atom is then stored in its vector's mini-structure. The search structure is similar to a hash table except that no algorithm is needed to define its elements, and the elements are always in sort order. To enhance performance, there is a separate search structure for each basetype.

Figure 9:
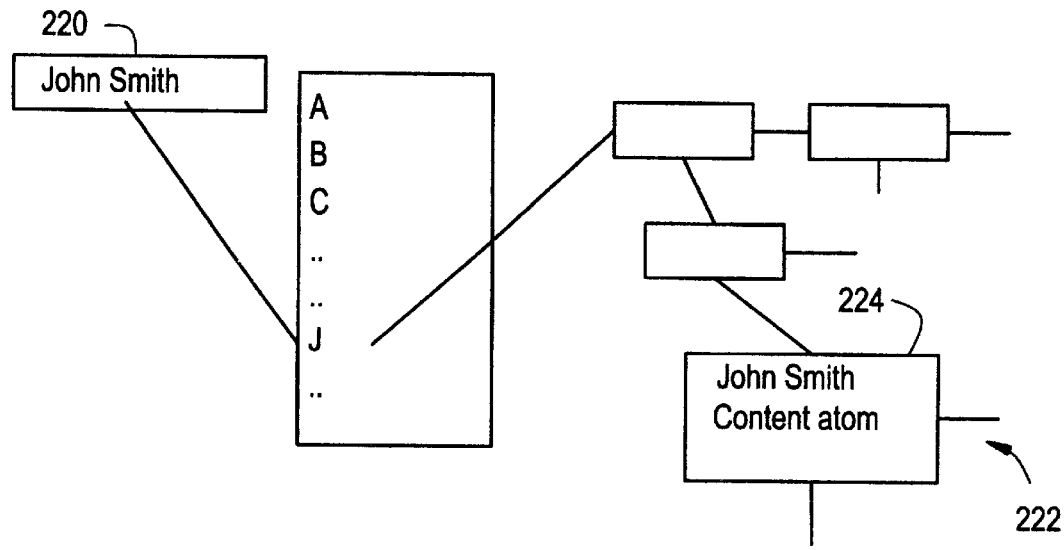
FIG. 9 depicts the search structure of the present invention.

An example of a search is shown in FIG. 9. Referring now to FIG. 9, suppose that a user wishes to locate a particular instance of "John Smith" 220. In the described embodiment, the most significant byte (i.e. "J") is used as a vector into search structure 222. The entire content (i.e. "John Smith") is used to find the correct position within search structure 222. Only one content atom 224 in the entire database contains the content of "John Smith." Once this content atom 224 is located, the user can then search all the instance atoms linked to the content atom to find the desired instance of "John Smith."

The method and system of the present invention also incorporate a variety of exposed access methods which are the sole means of access to the internal components. The exposed functions provide means for data storage and retrieval, defining and manipulating inner and outer relations and type atoms, as well as means for performing a variety of system functions. The exposed access methods are illustrated in FIG. 10.

Figure 10:
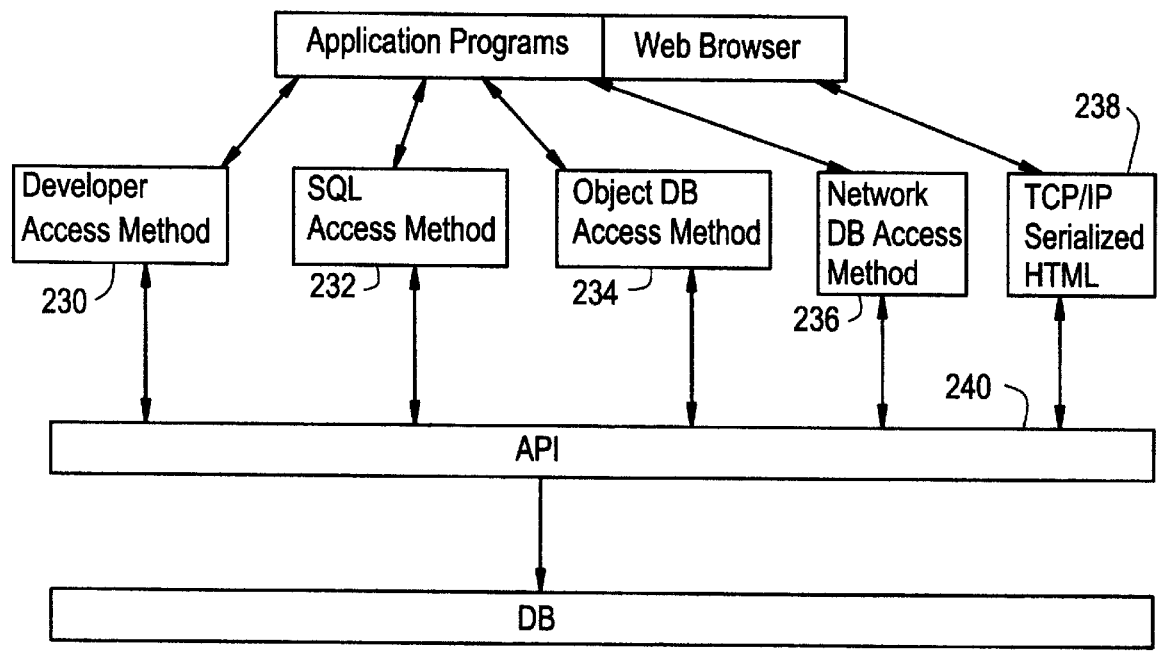
FIG. 10 depicts the exposed access methods of the present invention.

Referring now to FIG. 10, the exposed access methods may be an developer access method 230 (perhaps in the form of a class library) for direct use by application developers. Users may also access the system through other implementations of this layer/interface which present the system as an SQL access method 232, object access method 234, network access method 236, or other database access method, such as a TCP/IP serialized HTML 238. Note that the underlying structure of atoms and links remains the same in all implementations and that data can be simultaneously accessed by different methods according to users' needs. Note also that the exposed access methods, as well as the database itself, is stored in RAM 16 of FIG. 1. The access methods 230, 232, 234, 236, 238 interface to the database through the use of an application programmer interface (API) 240. In addition to the access methods shown, users may, through the use of other application programs (not shown), use API 240 to create a new database (as discussed below with reference to FIG. 11).

Figure 11:
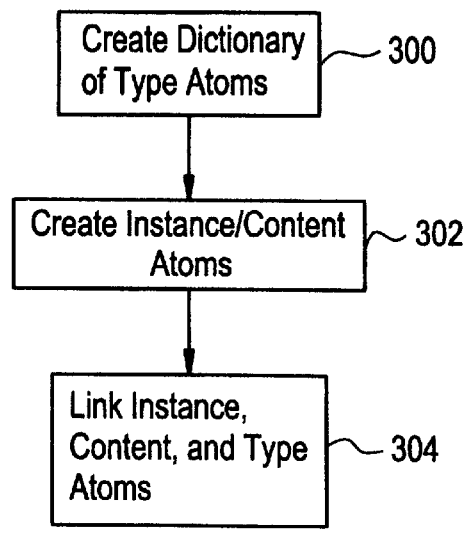
FIG. 11 is a flow chart illustrating a method of creating a database in accordance with the present invention.

Referring now to FIGS. 11 through 14, methods of using the present invention will be described. FIG. 11 illustrates a method of creating a new database. Through the use of API 240, a user or user application program first creates a dictionary of type atoms (step 300). As discussed above with reference to FIG. 6, the dictionary is also a database according to the present invention. Next, instance atoms and content atoms are created to represent the various data items stored in the database (step 302). Note that to a user, the combination of one instance atom and one content atom will usually be thought of as a single data item. Finally, the appropriate instance, content, and type atoms are linked together, through the use of pointers, to create molecules (step 304). To represent more complex data types, molecules may be linked together to form inner relations (as discussed above with reference to FIG. 3) and inner relations may be linked together to form outer relations (as discussed above with reference to FIG. 4).

Figure 12:
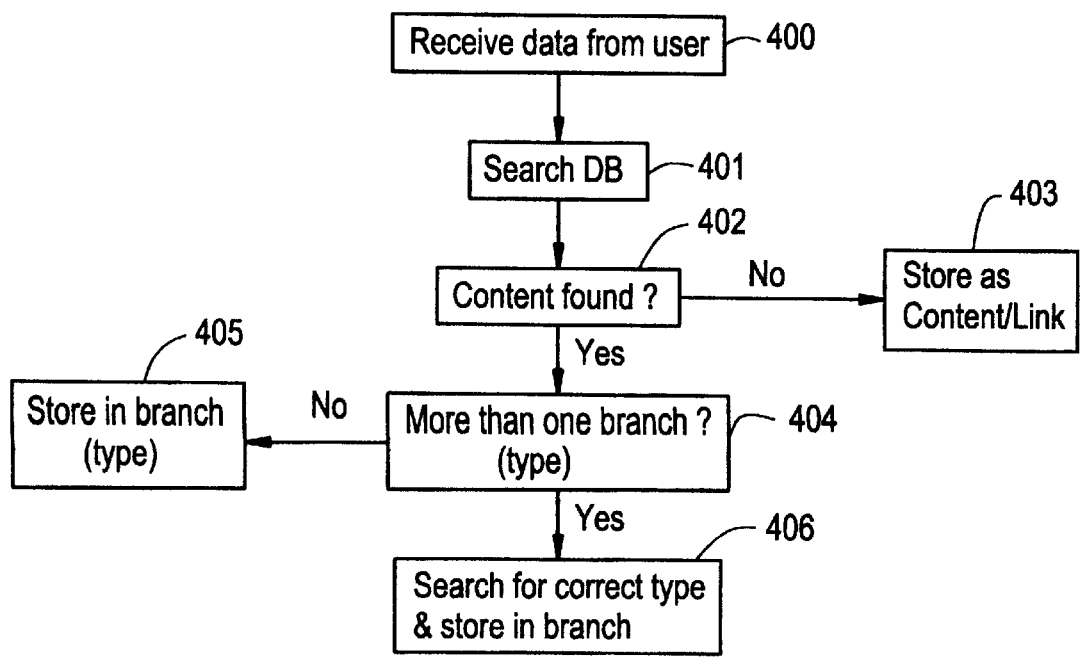
FIG. 12 is a flow chart illustrating a method of adding a content/instance atom to the database.

Referring now to FIG. 12, a method for adding new data to the database is illustrated. Data is received from the user (step 400) and the database is searched (step 401). Searching is described more fully below with reference to FIG. 13. The system determines if the data content exists in the database (step 402). If not, a content atom is instantiated and linked into the search structure (step 403). If the data content does exist already, the system determines if there is more than one branch (step 404). A branch is a link from a content atom to one or more instance atoms of the same type. If the content atom is only associated with one type atom, a new instance is stored in the single branch (step 405). If the content atom is associated with more than one type atom, the system searches for the correct type and stores the new instance in the correct branch (step 406).

Figure 13:
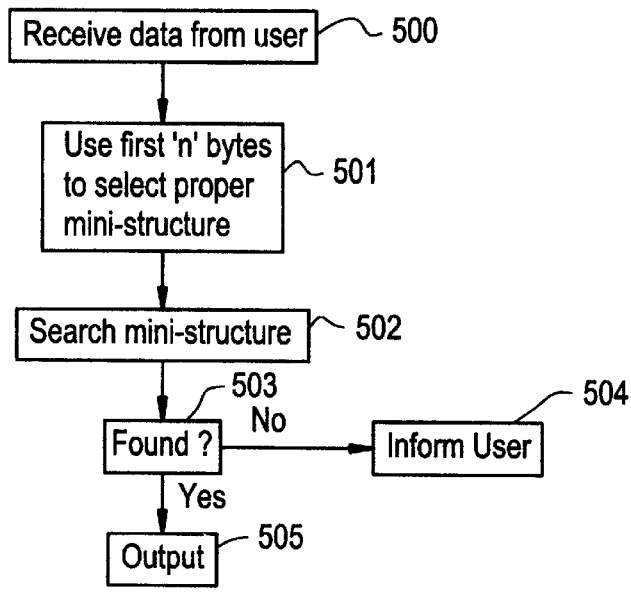
FIG. 13 is a flow chart illustrating a method of searching the database.

Referring now to FIG. 13, a method for searching the database will now be described. Data is received from the user (step 500). The first "n" bytes of the data is used to select the proper mini-structure in which to begin the search (step 501). The mini-structure is then searched (step 502). The system determines if the data has been found (step 503). If not, the user is informed that the data does not currently exist in the database (step 504). If the data is found, it is output to the user (step 505).

Figure 14:
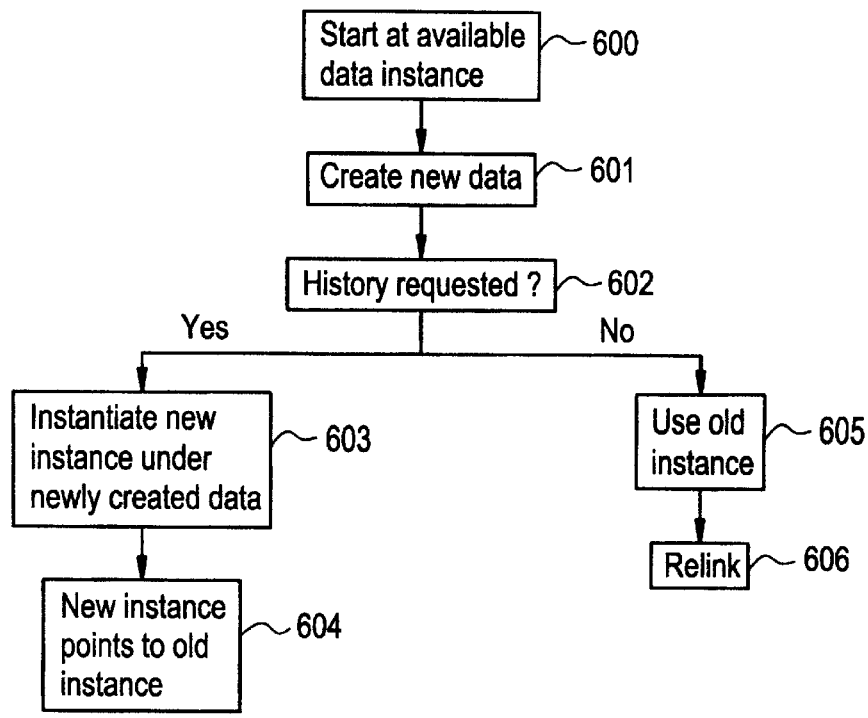
FIG. 14 is a flow chart illustrating a method of updating a content/instance atom.

Referring now to FIG. 14, a method for updating a data item in the database will now be described. The system first finds the content/instance pair which is being changed (step 600). The new data is created (step 601). If history has been requested (step 602), a new instance atom is instantiated under the newly created data (step 603) and the new instance is set up to point to the old instance (step 604). If history has not been requested, the old instance becomes the new instance (step 605) and is relinked to the newly created data (step 606).

The unique architecture of the present invention provides many advantages over the prior art. The present invention provides dynamic schema evolution, eliminating the need to take the database off-line for restructuring and thus also eliminating the overhead associated with of on-line restructuring. The system is extensible, supporting new, user-defined data types. The database stores data codexes just once (e.g. the string "John Smith" is physically stored just once no matter how many John Smith's may occur in the database). This feature reduces the size of any database and, when combined with its search structure of the present invention (described above with reference to FIG. 9), provides very high speed retrieval and update operations. The DBMS of the present invention eliminates the need for separately defined and maintained indexes because it maintains its own internal search structure for all data elements. The system is, therefore, more robust and requires less system administration.

The present invention automatically maintains a history of user-designated data elements, dramatically reducing the amount of programming effort needed to provide this facility in prior art systems. Maintaining history in prior art systems requires extensive programming and database design. In relational databases this is accomplished by defining separate history tables for each table where history is required. The system and method of the present invention provide this functionality automatically at the instance atom level with no separate external definitions by the developer or database designer. The invention's programming interface includes functions for reversing instance modifications using the history atoms. Programming for transaction reversal is minimized and conditions for system-initiated rollbacks can be easily defined.

The invention further supports object inheritance, encapsulation and polymorphism. The basetype of a type atom may change over time (through overloading) and a complete history is automatically maintained, eliminating the need to convert old data values as new definitions are added. For example, type atom "Temperature," may be defined as INTEGER (fixed number), but there may also be type atoms with typename "Temperature," with basetypes TEXT (formula) and BLOB (applet). As a result, data values can be accepted and stored in multiple formats. This functionality can be used to provide both inheritance and polymorphism. As another example, the typename SPEED can be defined as an integer (e.g, basic speed=65 mph), text describing the speed (e.g. "very fast," "extremely slow," "faster than light"), and a BLOB (with an applet that animates a speed bar). Note that polymorphism can also be implemented through the different user/developer interfaces into the database.

A further advantage of the present invention is its universal object-relational-hierarchical capability. Each inner relation may consist of any combination of molecules (and therefore any combination of data types, number of instances, etc.) and each inner relation may be changed at will. The present invention therefore dispenses with the need to work with static and inflexible record and database structures. Complex data structures can be implemented as a "native" part of the database, instead of requiring complicated manipulation and transformation to fit into the database structure.

Data structures can be defined to match any type of database (relational, hierarchical, etc.), and any access method (user interface/syntax, such as SOL) can be implemented. The DBMS effectively takes on the form of any desired DBMS, even though the underlying system of atoms and molecules remains unchanged.

The present invention further supports first normal form databases by ensuring that any data value is stored just once (in a content atom) and never duplicated. This feature provides the basis for building first normal form databases.

The present invention also allows for dynamic schema evolution. Any, or all, attributes of a type atom may be changed at will. For example, a type atom for "Humidity" may be changed, thereby changing the description of all instances of "Humidity" without affecting the associated content atoms or any of the instance atoms. This is a significant advantage over conventional DBMS's, where restructuring is required when changing record layouts, adding or removing fields, etc. Molecules (fields) may be added, change format, or erased from an inner relation (record) without affecting any other part of the database. The need for database restructure, unload/load, etc., is eliminated, reducing the cost and complexity of data administration and avoiding downtime.

The present invention also eliminates the need for index fields. Instead, an integrated search structure based on content atoms provides the ability to quickly search for a specific data value. The search structure of the present invention (as described above with reference to FIG. 9) is more robust than indexes, which are typically maintained in separate files. Thus the search structure of the present invention reduces the complexity of database design and administration.

The present invention has several performance and storage advantages over prior art systems. An instance atom may be disconnected, and reconnected, without touching the associated type or content atoms. For example, an instance of "John Smith" could be disconnected from type atom "Customer" and reconnected to type atom "Supplier" in one step. In a conventional DBMS, this operation would require the deletion of one record and the creation of another record, a much slower process.

Each data value/property (i.e. "John Smith") will occur only once within the database, in a content atom. This feature saves storage space. In addition, changing all instances with data content "John Smith" to "Tom Smith" requires just one transaction, improving system performance dramatically. Performance is also improved because a search for "John Smith" requires the identification of just one value, which then automatically provides all instances with the data content "John Smith." In addition, empty fields in records (i.e. fields that have a null-value) do not exist in the present invention, thus saving space and improving performance.

Complex data structures can be implemented as a "native" part of the database instead of requiring complex manipulation and transformation to fit into the database structure. This capability improves performance by avoiding transformation processes for each read and write, and also produces storage space savings. Further performance and storage savings are found in the present invention because history information is stored at the instance atom level, rather than at the record or object level.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. A memory for storing data for access by a program executing in an information handling system, comprising:
    a data structure stored in said memory, said data structure including information resident in a database used by the program and comprising:
    a plurality of content elements, wherein each content element contains a unique data item;
    a plurality of type elements, wherein each type element stores type data, and wherein each type element includes a unique type handle; and
    a plurality of instance elements, wherein each instance element links one content element and one type element.

2. A memory according to claim 1, wherein each data item is uniquely stored in only one content element.

3. A memory according to claim 1, wherein said data structure further comprises one or more inner relations, wherein each inner relation comprises one or more instance elements linked together.

4. A memory according to claim 3, wherein said data structure further comprises one or more outer relations, wherein each outer relation comprises one or more inner relations linked together by a linking means.

5. A memory according to claim 4, wherein the linking means comprises a content atom in a first inner relation containing a pointer to an instance atom in a second inner relation.

6. A memory according to claim 1, wherein said data structure further comprises one or more history links, wherein each history link links a new instance element to an old instance element.

7. A memory according to claim 1, wherein said data structure further comprises a data dictionary, wherein said type elements are stored in said data dictionary.

8. A memory according to claim 1, wherein said data structure further comprises a search structure, said search structure comprising:
    one or more mini-structures, wherein each mini-structure contains one or more content elements linked together; and
    for each mini-structure, a vector comprising one or more bytes of data, wherein said vector determines which mini-structure to search for a desired content element.

9. A computer-readable medium for storing data for access by a program executing in an information handling system, comprising:

a data structure stored on said computer-readable medium, said data structure including information resident in a database used by the program and comprising:

a plurality of content elements, wherein each content element contains a unique data item;

a plurality of type elements, wherein each type element stores type data, and wherein each type element includes a unique type handle; and a plurality of instance elements, wherein each instance element links one content element and one type element.

10. A computer-readable medium according to claim 9, wherein each data item is uniquely stored in only one content element.

11. A computer-readable medium according to claim 9, wherein said data structure further comprises one or more inner relations, wherein each inner relation comprises one or more instance elements linked together.

12. A computer-readable medium according to claim 11, wherein said data structure further comprises one or more outer relations, wherein each outer relation comprises one or more inner relations linked together by a linking means.

13. A computer-readable medium according to claim 12, wherein the linking means comprises a content atom in a first inner relation containing a pointer to an instance atom in a second inner relation.

14. A computer-readable medium according to claim 9, wherein said data structure further comprises one or more history links, wherein each history link links a new instance element to an old instance element.

15. A computer-readable medium according to claim 9, wherein said data structure further comprises a data dictionary, wherein said type elements are stored in said data dictionary.

16. A computer-readable medium according to claim 9, wherein said data structure further comprises a search structure, said search structure comprising:

one or more mini-structures, wherein each mini-structure contains one or more content elements linked together; and for each mini-structure, a vector comprising one or more bytes of data, wherein said vector determines which mini-structure to search for a desired content element.

17. An information handling system, comprising:

one or more processors;

one or more images of an operating system for controlling the operation of said processors;

one or more programs executing in said processors;

memory means; and a data structure stored in said memory means, said data structure including information resident in a database used by said programs, and comprising:

a plurality of content elements, wherein each content element contains a unique data item;

a plurality of type elements, wherein each type element stores type data, and wherein each type element includes a unique type handle; and a plurality of instance elements, wherein each instance element links one content element and one type element.

18. An information handling system according to claim 17, wherein each data item is uniquely stored in only one content element.

19. An information handling system according to claim 17, wherein said data structure further comprises one or more inner relations, wherein each inner relation comprises one or more instance elements linked together.

20. An information handling system according to claim 19, wherein said data structure further comprises one or more outer relations, wherein each outer relation comprises one or more inner relations linked together by a linking means.

21. An information handling system according to claim 20, wherein the linking means comprises a content atom in a first inner relation containing a pointer to an instance atom in a second inner relation.

22. An information handling system according to claim 17, wherein said data structure further comprises one or more history links, wherein each history link links a new instance element to an old instance element.

23. An information handling system according to claim 17, wherein said data structure further comprises a data dictionary, wherein said type elements are stored in said data dictionary.

24. An information handling system according to claim 17, wherein said data structure further comprises a search structure, said search structure comprising:

one or more mini-structures, wherein each mini-structure contains one or more content elements linked together; and for each mini-structure, a vector comprising one or more bytes of data, wherein said vector determines which mini-structure to search for a desired content element.

25. An information handling system according to claim 17, further comprising means for adding a data item to said data structure, said means for adding comprising:

means for receiving the data item;

means for creating a new content element containing the data element;

means for creating a new instance element linked to the new content element; and means for linking the new content element and an appropriate type element to the new instance element.

26. An information handling system according to claim 25, further comprising:

means for determining if the data item already exists in a content element in the data structure; and means for linking the new instance element to an existing content element.

27. An information handling system according to claim 17, further comprising means for searching the data structure to find a desired data item, comprising:

means for selecting a mini-structure to search based on one or more bytes in the desired data item; and means for searching the mini-structure to find the desired content element.

28. An information handling system according to claim 17, further comprising means for updating a content element in said data structure, said means for updating comprising:

means for creating a new content element;

means for creating a new instance element;

means for linking the new content element to the new instance element; and means for linking the new instance element to an old instance element.

29. An information handling system according to claim 17, further comprising means for updating a content element in said data structure, said means for updating comprising:

means for changing a data item in the content element; and means for relinking the changed content element to an existing instance element.

* * * * *